United States Patent
Romani

(10) Patent No.: US 6,890,602 B2
(45) Date of Patent: May 10, 2005

(54) PROCESS FOR THE PRODUCTION OF MICRO-FIBROUS SUEDE NON-WOVEN FABRIC

(75) Inventor: Gianni Romani, Configini (IT)

(73) Assignee: Alcantara S.p.A., Milan (IT)

( * ) Notice: Subject to any disclaimer, the term of this patent is extended or adjusted under 35 U.S.C. 154(b) by 0 days.

(21) Appl. No.: 10/410,880

(22) Filed: Apr. 10, 2003

(65) Prior Publication Data

US 2004/0006857 A1 Jan. 15, 2004

(30) Foreign Application Priority Data

Apr. 10, 2002 (IT) ..................................... MI2002A0769
Dec. 19, 2002 (IT) ..................................... MI2002A2686

(51) Int. Cl.$^7$ ................................................. B05D 1/38
(52) U.S. Cl. ..................................................... 427/412
(58) Field of Search ......................................... 427/412

(56) References Cited

U.S. PATENT DOCUMENTS

| | | | |
|---|---|---|---|
| 3,531,368 A | 9/1970 | Okamoto et al. | |
| 3,899,623 A | 8/1975 | Okazaki et al. | |
| 4,171,391 A | 10/1979 | Parker | |
| 4,390,566 A | 6/1983 | Umezawa et al. | |
| 5,436,399 A | 7/1995 | Koyama et al. | |

FOREIGN PATENT DOCUMENTS

| | | | |
|---|---|---|---|
| EP | 0 943 727 A2 | | 9/1999 |
| EP | 1 041 191 | | 10/2000 |
| EP | 1 164 169 | | 12/2001 |
| IT | 823055 | | 9/1968 |
| IT | 839921 | | 3/1969 |
| IT | 858373 | | 2/1970 |
| IT | 873699 | | 10/1970 |
| IT | 905222 | | 2/1972 |
| IT | 921871 | | 6/1972 |
| IT | MI2001 A 000516 | | 3/2001 |
| JP | 51-75178 | | 6/1976 |
| JP | 55-036318 | * | 3/1980 |
| JP | 58-076580 | * | 5/1983 |
| JP | 09-250064 | * | 9/1997 |
| JP | 2000-256972 | * | 9/2000 |
| JP | 2000-0303368 | * | 10/2000 |
| JP | 2001-55670 | | 2/2001 |
| WO | WO 02/06582 A1 | | 1/2002 |

* cited by examiner

*Primary Examiner*—Erma Cameron
(74) *Attorney, Agent, or Firm*—Pauley Petersen & Erickson

(57) ABSTRACT

A process for the preparation of a micro-fibrous non-woven fabric of the suede leather type includes spinning a two-component fiber of the "islands in the sea" type having an island component and a sea component and then preparing a felt from the two-component fiber. The felt is treated with thermal stabilization and impregnated with polyurethane from an aqueous polyurethane emulsion. The polyurethane is fixed to the felt and the sea component is removed. The felt is then impregnated with polyurethane for a second time with an aqueous emulsion or a high durability solution in organic solvent. The polyurethane is then fixed to the felt for a second time to obtain a non-woven fabric and a finishing treatment is applied to the non-woven fabric.

18 Claims, No Drawings

PROCESS FOR THE PRODUCTION OF MICRO-FIBROUS SUEDE NON-WOVEN FABRIC

The present invention relates to a process for the production of synthetic micro-fibrous non-woven fabric of the "suede" type that does not require use of organic solvents or that drastically reduce the use of that solvents, by which it is possible to obtain a product with optimum physical-mechanical and "hand" characteristics; the invention relates further to some methods for the treatment of products obtained and/or used in the course of the same process. A process for the production of micro-fibrous suede non-woven fabric is known and currently marketed commercially, based on descriptions in Italian Patents n. 823055, 839921, 858373, 873699, 905222, 921871 and U.S. Pat. No. 3,531,368.

According to these patents, a two-component fiber of the "islands" in the "sea" type is prepared by feeding two polymers into a spinneret in such way that the "sea" component completely encircles the other component constituted by several filaments that form the various "islands". In the two-component fiber the "sea" component is generally constituted by polystyrene (PST) or another polymer that has such spinning characteristics as to enclose the micro-fibers of the "island" component and is furthermore easily soluble in standard organic solvents. The "island" component is, preferably, constituted by polyethyleneterephthalate (PET) or nylon. A felt is prepared from the fiber obtained by means of needle-punching, it is impregnated with an aqueous polyvinyl alcohol (PVA) solution, the "sea" component is dissolved in trichloroethylene ("trielene"), the felt is impregnated with a polyurethane (PU) in dimethylformamide (DMF) solution and, finally, the PVA is eliminated.

The product thus obtained is cut into two along the section, buffed, dyed in suitable jets of dye, and finished.

It is very obvious that this process requires the use of two organic solvents (trielene and dimethylformamide), that must be recovered for reuse in the production process and/or disposed of, which require considerable labor and raises industrial costs, including those for safeguarding the environment.

In order to eliminate or reduce the recourse to the aforesaid solvents, other processes have been proposed for the production of micro-fibrous suede non-woven fabric, where the "sea" component is constituted by other polymers such as polyethylene (extractable with toluene), nylon 6 (soluble in formic or sulfuric acid) or certain modified polyesters (soluble in alkaline or acid solutions) etc.

Polyurethanes dispersed in aqueous emulsion have also been described that could replace the polyurethane in dimethylformamide solutions or in other organic solvents (for example, in European patent application n. 1041191). These processes, however, even where they seem to have resolved the problem of the use of organic solvents, remain problematic because of the chemical and physical-mechanical characteristics of the product.

The process that provides for direct impregnation with PU in aqueous emulsion of a felt made from two-component fiber and the subsequent dissolving of the "sea" component with a "cleaned up" solvent (which would eliminate the use of dimethylformamide, the organic solvent for dissolving the "sea" component, and the PVA impregnation and removal phases), leads to a finished product with less than optimal "hand" and physical-mechanical characteristics, above all in terms of abrasion resistance, since the PU/micro-fiber bond is weakened by extracting the "sea" component. Such process is called "After-sea dissolving" process in the literature.

In the processes in which the felt is first impregnated with a solution of PVA, followed by the dissolving of the "sea" component with an organic solvent and subsequent impregnation with a solution of PU in organic solvent (generally DMF or dimethylacetamide, DMAc), the bond between PU and micro-fiber is better and, consequently, all the physical-mechanical characteristics, and abrasion resistance above all, are better.

The present invention aims at overcoming all the aforementioned disadvantages. More particularly, the present invention is directed to a process for the production of micro-fibrous non-woven fabric of the suede leather type, which reduces to a minimum or altogether eliminates the use of organic solvents, which does not introduce a high cost of disposal and recovery, which permits production of products with chemical and physical-mechanical characteristics equal if not substantially superior to those of the products of the present art.

In the Italian Patent application n. MI2001A000516, in the name of the same Applicant, the production of non-woven fabric of the suede leather type was optimized in a process that does not need organic solvents, by using and impregnating the felt with a high saponification value polyvinyl alcohol (H.S.PVA), suitably mixed with reticulating agent and fixed thermally, then dissolving the "sea" component in an aqueous solution of sodium hydroxide and subsequently impregnating with an aqueous polyurethane emulsion-dispersion. The process according to the patent application of the Applicant overcomes the problems of insufficient adhesion between micro-fiber and polyurethane that occurs with processes of the "After-sea dissolving" type to give a product with optimal physical-mechanical and "hand" characteristics, and abrasion resistance.

The invention according to the present application allows the production of micro-fibrous non-woven fabric of the suede leather type, with optimal physical-mechanical properties, abrasion resistance, and appearance, makes the production process considerably simpler, and above all reduces the number and the kinds of raw materials used in order to achieve the objective, a clear advantage in economizing the process.

Therefore the object of the present invention is a process for the preparation of micro-fibrous non-woven fabric of the suede leather type comprising the following stages:
a) spinning of a two-component fiber of the "islands" in the "sea" type;
b) preparation of a felt from the two-component fiber;
c) thermal stabilization treatment of the felt;
d) impregnation with aqueous polyurethane emulsion;
e) fixing of the polyurethane to the felt;
f) removal of the "sea" component;
g) impregnation with polyurethane again either as an aqueous emulsion or in the form of a high durable solution in organic solvent;
h) fixing of the polyurethane;
i) finishing treatment of the non-woven fabric obtained;

According to the present invention the "island" component is chosen from polymers normally employed in textile applications; preferably it can be constituted by polyethyleneterephthalate or modified polyesters (as an example polytrimethyleneterephthalate, etc), from cationic polyesters, nylon or other types of polyamides, from polyethylene, polypropylene or other types of polyolefine.

The "sea" component is chosen from polymers that must be able to be dissolved and removed by means of treatment with water, aqueous alkaline or acid solutions. Preferably they are constituted by nylon or other polyamides, modified polyesters and, in a generalized manner, other spinnable polymers with the essential characteristic of being soluble in water or in aqueous acid or alkaline solutions, such, for instance, polymer of the polyhydroxyalkanoate group (PHA).

The ratio between the "island" component and the "sea" component used in the two-component fiber spinning must be between 20/80 and 80/20.

Thermal stabilization treatment according to stage c) can be carried out with warm water or warm air.

The impregnations with aqueous polyurethane, step d) and g), are carried out, in step d) with a polyurethane aqueous emulsion, and in step g) either with an aqueous polyurethane emulsion or with a high durable polyurethane solution in organic solvent. Such polyurethane impregnations may vary as far as the polymer amounts in the first and in the second impregnation are concerned. Impregnation with aqueous PU emulsion is carried out using emulsions with various amount of polymer or varying polymer characteristics, or it is carried out with the same PU emulsion which gives another significant procedural advantage.

The two fixing operations can, in their turn, be carried out according to distinct methodologies. In the case of an aqueous emulsion, the fixing has to be carried out by saturated vapour treatment, or by microwave/radiofrequency drying, or by acid or saline aqueous solution coagulation. In the case of a polyurethane in organic solvent, the fixing is carried out by a treatment with an antisolvent (generally, water). Anyhow, all fixing methods, independently from the polyurethane kind, are carried out according to well known techniques, the people skilled in the art being called to select the best possible techniques.

The removal of the "sea" component in stage f) is carried out by means of a solvent chosen from those previously indicated as adapted to dissolving the same component. As an example, it's possible to use an aqueous sodium idroxide solution or aqueous alkaline, aqueous acid solution, or hot water.

According to the process of the present invention, it is necessary that the tie between the felt and the polyurethane in aqueous emulsion firstly applied can resist the treatment to extract the "sea" component of the two-component fiber. For this purpose, it is necessary to fix the polyurethane so that it can resist such treatment; the fixing of the polyurethane can occur by means of adding of reticulating agents known to the art which, according to their type, are active at room temperatures or relatively high temperatures (110° C., 200° C.).

The operations needed to carry out the process of the present invention will be described in greater detail below, while the examples of embodiments will allow the advantages of the same process to be appreciated without, however, creating undue restriction of the scope of the present invention.

A two-component fiber is spun through a spinneret well known to the experts and this allows a composite fiber to be obtained in which one of the polymers is arranged around elementary fibers of the other polymer. The fiber thus obtained is treated according to finishing methods known in the spinning technology; in particular the two-component fiber, before being stretched, must have a weight of between 5 and 15 denier, still better if it is between 8 and 14 denier Stretching is executed with stretching ratios that vary generally in the interval 2 to 8, preferably in the interval 3 to 5, with the final denier of the two-component fiber between 2 and 8 denier and the denier of the "island" component in the interval 0.001 to 0.5 denier. The two-component fiber, once stretched, is "crimped" in appropriate equipment until it has a number of curls between 4 and 15 per centimeter and subsequently it is cut into staple of length between 40 and 60 mm, better still if it is between 45 and 55 mm.

In the present invention it is preferable to use a two-component fiber constituted by polyethyleneterephthalate (PET) or polytrimethyleneterephthalate (PTT) or polybutylenterephtalate (PBT), or cationic-polyester as "island" component. Modified polyesters such as PET-5-sodiumsulfo-isophthalic acid ethyleneglycol ester (hereinafter referred to as TLAS), soluble in an alkaline aqueous solution, can be used as "sea" component. However the invention does not exclude other modified polyesters easily extractable into neutral, acid or alkaline aqueous solutions. Moreover, the polymers of polyhydroxyalkanoate group (PHA) can be used as "sea" component. Another polymer material which can easily be used as "sea" component is poly(lactil acid) (hereinafter referred as PLA): this polymer is obtained from natural vegetable sources and is easily hydrolizable under mild conditions in alkaline solutions.

A felt is prepared from such two-component fiber by needle-punching; the apparent density, once "stabilized dimensionally" by heat treatment (warm water or warm air), preferentially must be in the interval 0.1 and 0.5 g/cm$^3$, still better again if it is between 0.15 and 0.4 g/cm$^3$, with the thickness between 1.5 and 4 mm, with the aim of obtaining a final non-woven fabric with good softness.

The felt thus obtained undergoes a first impregnation with an aqueous polyurethane emulsion (PUD), at a concentration between 1 and 30% by weight, at room temperature, giving a concentration of PUD in the interval between 5 and 30%. According to an embodiment, the felt having to undergo two impregnations with polyurethane, one before and one after dissolving the "sea" component, a quantity of PUD equal to between ⅛ and ⅞ of the total amount necessary of polyurethane is put into the first impregnation, while the remaining part is put into the second impregnation.

It is not possible to add the ⅞ of polyurethane in the first impregnation, that is completely before dissolving the "sea" component, otherwise there would be regression into a process of the "After-sea dissolving" type and into all the problems due to insufficient PU/micro-fiber adhesion that it gave rise to.

However, it is not possible to add less than ⅛ of PUD in the first impregnation, otherwise the consistency of the resulting intermediate would not be such as to resist to mechanical stresses of the treatment for dissolving the "sea" component.

The PUD, applied to the felt in this stage, must resist all the other production steps (conditions of dissolving the "sea" component, resistance during the second impregnation stage, acid and basic treatments at high temperatures in the dyeing process) until the attainment of the finished dyed product, for which it needs to be subjected to a "fixing" such as to enable it to achieve the objective. The PUD further, once fixed, must have good durability characteristics in terms of resistance to the hydrolytic conditions and UV degradation.

In order to extract the "sea" component of the two-component fiber, a treatment could be carried out with an aqueous solution of sodium hydroxide, with a concentration of between 1 and 15% by weight and at a temperature of between 40 and 90° C.; the time to dissolve the "sea" component varies according to the conditions from 4 to 40 minutes. Generally, the dissolving of the sea component may be carried out in a neutral acid or basic aqueous solution according to the employed sea component and the solubility thereof.

In a generalized manner, the dissolving conditions are optimized in order to selectively dissolve the "sea" component in the shortest possible time and, in such time, to dissolve the minimum possible amount of applied PUD and "island" component in order to reduce deterioration of the sheet. The piece is subsequently washed abundantly with water at room temperature, to avoid partially dissolving the "island" component, in case of use of aggressive acid or basic aqueous solutions.

Non-woven fabric from which the "sea" component has been extracted is impregnated for a second time with polyurethane in aqueous emulsion (not necessarily the same as that used in the first impregnation), at room temperature with a concentration varying between 3% and 20% metered onto the piece by suitable nip rolls until the desired total concentration of PUD is attained which, expressed as a ratio between PUD/microfibre, must be between 25% and 70%, and better if between 40 and 60%.

Non-woven fabric from which the "sea" component has been extracted, is alternatively impregnated for a second time with high durability polyurethane in organic solvent (PU), at room temperature, with a concentration varying between 2% and 20%, metered onto the piece by suitable nip rolls, until the desired total polyurethane concentration is attained, which, expressed as a polyurethane/microfibre ratio, must be between 25% and 70%, and better if it be between 40 and 60%.

With the aim of obtaining an end product with characteristics of softness and appearance similar to those of products obtained with traditional processes using organic solvents, the final polyurethane in the non-woven fabric section must be present mainly in the central zone and not towards the external edges. Such optimal distribution of the polyurethane can be achieved only by using the double impregnation of polyurethane (before and after dissolving the "sea" component) which is the object of the present invention; with a pure "After-sea dissolving" process on the other hand, the distribution of the polyurethane over the section is rather uniform, with a slightly higher concentration at the edges of the piece.

The polyols that constitute polyurethane in aqueous emulsion (PUD) can be polymers of the polyether type, polyester type, polycarbonate type and co-polymers of polyester-polycarbonate type and polyester-polyether type and polycarbonate-polyether type; the polyurethane can be prepared using one or more types of such polyols, which must have a medium numerical molecular weight of between 500 and 5000, and better if it is be between 600 and 2000.

The diisocyanates used for the synthesis of the PUD could be either aliphatic or aromatic; chain extenders used, on the other hand, are generally low molecular weight molecules, that have two or more active hydrogens that react with the isocyane groups.

The synthesis of PUD is generally conducted by preliminarily preparing the pre-polymer with terminal isocyanic groups, incorporating it into an aqueous emulsion by violent agitation and extending it, with a suitable extender, until the desired molecular weight is attained.

In order to carry the pre-polymer into emulsion either external emulsifiers can be resorted to or pre-polymers can be prepared containing a fraction with groups of hydrophilic character and/or charges, such as to give a polyurethane pre-polymer self-emulsifier. The PUD self-emulsifiers are preferable, obtained by groups that become negatively charged, such as dimethylolpropionic acid (DMPA) or functionalized sulfonic acids, thus forming a negatively charged polyurethane emulsion in aqueous solution; such groups are added in a concentration varying from 0,5 to 10% with respect to the concentration of the polyols and generally neutralized with triethylamine, just before proceeding to the formation of the aqueous dispersion, once the synthesis of the prepolymer is completed.

In the case of imitation leather and synthetic suede, the ageing tests that are employed to measure "durability" are the following:

1. Aging under U.V. rays (called for short Xenotest 1200) carried out with the Xenotest 1200 CPS equipment under the following conditions: relative humidity 20±10%, temperature of the black panel 100±3° C., power of irradiation m60 W/m$^2$, time of exposure 138 h.
2. Resistance to Hydrolysis (called shortly "Jungle Test") carried out in a climatic room under the following conditions: temperature 75±1° C., relative humidity 90±3%, time of exposure 5–7–10 weeks.

The durability, after the ageing tests, is shown in the following way:

Measurement of aspect and weight loss, the former by visual comparison with 5 samples standard, after the material has been subjected to an abrasion test with the Martindale abrasimeter, at a pressure of 12 Kpa.

Variation in the physical-mechanical characteristics, and variation in the breaking strain in particular.

PU in solvent when applied in the second impregnation, has the peculiarity of being a high durability polyurthane, which allow it to strongly resist against all ageing tests and to be processed also at temperature higher than the ones the usual polyurethane in solvent tolerate, when employed under similar purposes.

This solvent polyurethane applied to the piece during the second impregnation according to the present invention is characterized in that it has "hard" segments consitutted by urethanic groups (reaction between diisocyanate and polyols) and ureic groups (reaction between free isocyanate groups and water) and "soft" segments constituted by a polyols-polycarbonate/polyols-polyester mixture in a ratio ranging from 80/20 to 20/80.

Particularly, the polyurethane "soft" segments are constituted by a mixture of polyols/polycarbonate/polyester, while the "hard" segments are constituted by ureic groups deriving from aromatic diisocyanates and, preferably, deriving from the reaction between 4,4'-diphenylmethane-diisocyanate and water, thus to produce the extending agent directly in the reactor.

To practically carry out the present invention, polycarbonate diols can be selected among polyhexamethylencarbonatoglycole (preferred), polypentamethylencarbonatoglycole, and polyheptamethilencarbonatoglycole, while polyol polyester can be selected among polyneopentyladipateglycole (preferred), polyhexamethyleneadipateglycole, or polycaprolactonediole.

The employed organic diisocyanate are aromatic, such as 2-4/2-6 toluendiisocyanate, independently from the 2-4/2-6 isomer ratio (better, in the case of 80/20 radio), or 4-4' diphenylmethanediisocyanate as such or mixed with 2-4 isomer, in the weight ratio from 0,01 to 50% of 2-4' isomer, or such as the mixtures of toluendiisocyanate and diphenylmethanediisocyanate in any ratio between the same and their isomers.

Employable solvents are N,N-dimethlfomamide, N,N-dimethulacetamide, dimethylsulphoxide, acetone, methulketon, tetrahydrofuran, N-methyl-pyrrolidone.

The preparation methos of such polyurethanes are those well known to the people skilled in the art, which will be carried out with the care to use raw materials chosen from the ones inside the definition of the object according to the present invention.

The aqueous emulsion PUD used in the first impregnation is fixed to the felt by one of the following technologies, which is selected by the expert on the ground of the emulsion PUD to be employed:

1. Coagulation of the PUD in an acidic solution or a salt solution (for instance an aqueous solution of calcium nitrate or chloride). Any acid can be employed, even though, for practical reasons, that generally used is either acetic or phosphoric acid.
2. Direct drying by microwave or radio frequencies, of between 5 and 20 KW power.
3. Treatment with saturated vapour at a temperature of between 100 and 110° C., by addition the PUD aqueous solution a thickening agent at a concentration of from 0,5 to 10% w/w.

The technologies allow optimization of the finished product, in terms of PUD distribution across the section, porosity, resistance and final physical-mechanical characteristics. Classic convection drying by warm air cannot be used, however, since this provokes migration of the PUD towards the external edges of the piece and does not confer any porosity on the fixed PUD, given the extreme slowness of the treatment, thus compromising the characteristics of the finished product.

A quantity of reticulating agent varying between 0.5 and 10% by weight can be added to the aqueous polyurethane emulsions used for the impregnation, to achieve the desired physical-mechanical, solvent-resistance, and durability characteristics; such reticulating agents could be melamines, aziridine, carbodiimides, epoxides, zirconium compounds, or isocyanate bases, or blocked isocyanate.

The fixing of the high durability PU solution in organic solvent applied in the second impregnation is carried out by dipping the piece into a solution of solvent/non solvent in the ratio ranging from 0/100 to 40/60 and at a temperature between 20 to 50° C.

Under these coagulation conditions are optimum porosity of polyurethane and an optimum hand of the finished product can be obtained.

An impregnation with an aqueous silicone solution at a concentration of between 0,1 and 1,1% by weight, is carried out subsequently; such silicone has the purpose of facilitating the extraction of "nap" during the buffing phase and thus improving the final aspect characteristics.

The final piece is then dried in a warm-air oven and subjected to the subsequent production phases, which are, respectively, cutting in two along the section, buffing, dyeing, and finishing. The operating conditions of these productive stages reflect those used in the production of non-woven fabric using organic solvents.

EXAMPLE 1
(Preparation of Non-woven Fabric Until the First Impregnation with PUD Aqueous Emulsion)

A staple fiber is prepared formed from PET (polyethyleneterephthalate) micro-fiber (0.13 and 0.15 denier) in a modified polyester matrix (TLAS), having the following characteristics:
1—denier 3,9
2—length 51 mm
3—curl approximately 4/cm
4—stretch ratio 3.5/1

In particular, the fiber is formed from 57 parts by weight of PET and 43 parts by weight of TLAS. If observed in section the fiber reveals the presence of 16 micro-fibers of PET incorporated into the TLAS matrix. A raw felt is prepared from the fiber in staple that is subjected to needle-punching to form a needle-punched felt with density of 0.217 g/cc. The needle-punched felt is shrunk in warm water at a temperature of 95° C. giving a density of 0,331 g/cc. Such felt is called F1.

EXAMPLE 2
(Preparation of Non-woven Fabric Until the First Impregnation with the PUD Aqueous Emulsion)

This example copies example n° 1 with the difference of using polytrimethyleneterephthalate (PTT) in place of polyethyleneterephthalate (PET) as "island" components, giving an intermediate non-woven fabric felt called F2.

COMPARATIVE EXAMPLES 3, 4
(Preparation of Non-woven Fabric Until the First Impregnation with the PUD Aqueous Emulsion)

This example copies examples n° 1, 2 with the difference of using poly(lactic acid) (PLA) in place of the TLAS as "island" components, giving intermediate non-woven fabric felts called F3, F4 respectively when the "island" components is PET or PTT.

EXAMPLE 5
(Preparation of the Non-woven Fabric One)

A sample of felt F1 is impregnated with 4.0% Witcobond 279-34 polyurethane aqueous emulsion (polyether based, aliphatic, anionic PUD, produced by Baxenden Chemicals); such PUD is metered onto the piece by suitable squeezing rollers giving a PUD/PET ratio of 16%. PUD is fixed to the piece by coagulation in a 35% solution of $CH_3COOH$. The TLAS "sea" component is then dissolved by carrying out a treatment in 6% NaOH for 30 minutes at 60° C. and subsequently washing the intermediate piece abundantly with water. The intermediate therefore obtained is again impregnated with a high durability polyurethane 10% DMF solution and coagulated with water at room temperature until a final totale PUD/PET ratio of 50% is obtained.

The DMF solution of high durability polyurethane is prepared aside. Over a first step (prepolymerization) PHC and PNA, both having 2,000 molecular weight, are reacted with MDI at 65° C. temperature and under stirring, in a isocyanate/diol molar ratio of 2,9/1. After 3 hours from the reaction beginning, the obtained prepolymers is cooled to 45° C. and DMF diluted, with a moisture content of 0,03% until obtaining a 25% prepolymer solution with a content of free NCO equal to 1.46%.

Then, by keeping the temperature at 45° C., DBA and water dissolved in DMF are slowly added, during a 5 minute period, such to have a polyurethane-polyurea with a 43,000 calculated molecular weight. After the temperature is brought to 65° C., the reactor is kept under stirring over 8 hours again, by obtaining, at the end, a polyurethane-polyurea solution, time stable, with a viscosity of 24,000 mPa*sec at 20° C.

A 0,2% aqueous siliconic solution is applied to the product and then it is ent into two equal parts along the section and each part is surface buffed. The final non-woven fabric is called P1.

EXAMPLE 6
(Preparation of the Non-woven Fabric)

A sample of felt F1 is impregnated with 2.9% Witcobond 279-34 polyurethane acqueous emulsion (polyether based, aliphatic, anionic PUD, produced by Baxenden Chemicals), such PUD is metered onto the piece by suitable squeezing rollers giving a PUD/PET ratio of 10%. The PUD is fixed to the piece by coagulation in 35% CH₃COOH solution. The TLAS "sea" component is then dissolved by carrying out a treatment in 6% NaOH for 30 minutes at 60° C. and subsequently washing the intermediate piece abundantly with water. The intermediate therefore obtained is again impregnated with the a high durability polyurethane 12% DMF solution (synthesized according to the proceeding example) and coagulated with water at room temperature until a final Putotal/PET ratio of 50% is obtained. A 0,2% aqueous silicone solution is applied to the product and then it is cut into two equal parts along the section and each part is surface buffed. The final non-woven fabric is called P2.

Similar results, with finished products having good surface appearance, "hand" and physical-mechanical properties, have also been obtained using PLA as "sea" component or using the PTT as "island" component.

The chemical-physical characteristics and abrasion resistance are shown in Table 1.

TABLE 1

| Products | Tenacity L (Kg/cm) | Tenacity T (Kg/cm) | Elongation L (%) | Elongation T (%) | Aspect after abrasion * | Weight loss in abrasion (%) * |
|---|---|---|---|---|---|---|
| P1 | 9.3 | 6.5 | 65 | 115 | 4/5 | 3% |
| P2 | 9.9 | 7.0 | 69 | 108 | 4/5 | 2.5% |

* Abrasion on Martindale for 20000 cycles, at a pressure of 12 Kpa.

Appearance assessed by visual comparison with 5 standard samples, after the material was subjected to the abrasion test.

EXAMPLE 7
(Preparation of the Non-woven Fabric)

A sample of felt F1 is impregnated with 7.5 % Witcobond 279-34 polyurethane aqueous emulsion (polyether based, aliphatic, anionic PUD, produced by Baxenden Chemicals); such PUD is metered onto the piece by suitable wetting rollers giving a PUD/PET ratio of 30% (½ of the total PUD required). The PUD is fixed to the piece by coagulation in a 10% solution of CH₃COOH. The TLAS "sea" component is then dissolved by carrying out a treatment in 10% NaOH for 20 minutes at 60° C. and subsequently washing the intermediate piece abundantly with water. The intermediate therefore obtained is again impregnated with the PUD used in the first impregnation and coagulated in 10% acetic acid until a final PUD/PET ratio of 60% is obtained. A 0.45% aqueous silicone solution is applied to the product and then it is cut into two equal parts along the section and each part is surface buffed. The final non-woven fabric is called P3.

COMPARATIVE EXAMPLES 7, 8, 9, 10
(Preparation of the Non-woven Fabric)

These examples trace example No. 7 with the difference of using a different PUD aqueous emulsion. The products P4, P5, P6 are obtained by impregnating with a solution of respectively: Witcobond 298-78 (polyether based, aliphatic, anionic PUD, produced by Baxenden Chemicals), Astacin Finish PF (polyether based, aliphatic, anionic PUD, produced by Basf) and Impranil DLV (polyether-polyester based, aliphatic, anionic PUD produced by Bayer).

EXAMPLE 11
(Preparation of the Non-woven Fabric)

A sample of felt F1 is impregnated with 10.5% Witcobond 279-34 polyurethane aqueous emulsion (polyether based, aliphatic, anionic PUD, produced by Baxenden Chemicals); such PUD is metered onto the piece by suitable wetting rollers giving a PUD/PET ratio of 45% (¾ of the total PUD required). The PUD is fixed to the piece by coagulation in a 10% solution of CH₃COOH. The TLAS "sea" component is then dissolved by carrying out a treatment in 10% NaOH for 20 minutes at 60° C. and subsequently washing the intermediate piece abundantly with water. The intermediate therefore obtained is again impregnated with the PUD used in the first impregnation and coagulated in 10% acetic acid until a final PUD/PET ratio of 60% is obtained. A 0.45% aqueous silicone solution is applied to the product and then it is cut into two equal parts along the section and each part is surface buffed. The final non-woven fabric is called P7.

EXAMPLE 12
(Preparation of the Non-woven Fabric)

A sample of felt F1 is impregnated with 7.5% Witcobond 279-34 polyurethane aqueous emulsion (polyether based, aliphatic, anionic PUD, produced by Baxenden Chemicals); such PUD is metered onto the piece by suitable wetting rollers giving a PUD/PET ratio of 30% (½ of the total PUD required). The PUD is fixed to the piece by drying in microwave oven (power 10 KV, drying time 5 minutes). The TLAS "sea" component is then dissolved by carrying out a treatment in 10% NaOH for 20 minutes at 60° C. and subsequently washing the intermediate piece abundantly with water. The intermediate therefore obtained is again impregnated with the PUD used in the first impregnation and dried in the microwave until a final PUD/PET ratio of 60% is obtained. A 0.45% aqueous silicone solution is applied to the product and then it is cut into two equal parts along the section and each part is surface buffed. The final non-woven fabric is called P8.

Similar results, with finished products having good surface appearance, "hand" and physical-mechanical properties, have also been obtained using PLA as "sea" component or using the PTT as "island" component.

The chemical-physical characteristics and abrasion resistance are shown in Table 2.

TABLE 2

| Products | Type of "Fixing" | Tenacity L (Kg/cm) | Tenacity T (Kg/cm) | Stretch L (%) | Stretch T (%) | Aspect after abrasion * | Weight loss in abrasion (%) * |
|---|---|---|---|---|---|---|---|
| P3 | coagulation in CH₃COOH | 10.5 | 7.0 | 70 | 110 | 4/5 | 13% |
| P4 | coagulation in CH₃COOH | 9.7 | 6.9 | 72 | 115 | 4/5 | 12% |

TABLE 2-continued

| Products | Type of "Fixing" | Tenacity L (Kg/cm) | Tenacity T (Kg/cm) | Stretch L (%) | Stretch T (%) | Aspect after abrasion * | Weight loss in abrasion (%) * |
|---|---|---|---|---|---|---|---|
| P5 | coagulation in CH₃COOH | 11.3 | 8.2 | 67 | 106 | 4/5 | 14% |
| P6 | coagulation in CH₃COOH | 9.5 | 6.8 | 82 | 120 | 4/5 | 12% |
| P7 | coagulation in CH₃COOH | 9.9 | 7.0 | 62 | 100 | 4/5 | 14% |
| P8 | Microwave | 10.7 | 7.3 | 67 | 105 | 4/5 | 14% |
| P9 "After-sea dissolving" Process | coagulation in CH₃COOH | 8.5 | 6.0 | 70 | 105 | 2/3 | 20% |
| P10 | coagulation in CH₃COOH | 12.0 | 9.0 | 65 | 105 | 4/5 | 11% |
| P11 | coagulation in CH₃COOH | 11.5 | 8.6 | 71 | 110 | 4/5 | 12% |
| P12 | coagulation in CH₃COOH | 11.0 | 8.3 | 73 | 115 | 4/5 | 13% |

* Abrasion on Martindale for 20000 cycles, at a pressure of 12 KPa.

Appearance assessed by visual comparison with 5 standard samples, after the material was subjected to the abrasion test

EXAMPLE 17

Carried out as for Example 7, except for the three polyurethanes from Comparative Examples 8, 9 and 10 being used respectively for the second impregnation, giving the following products:
P14 (with PUD Astacin Finish PF);
P15 (with PUD Witcobond 298-18);
P16 (with PUD Impranil DLV)
The characteristics of these products are shown in previous Table 2.

I claim:
1. A process for the preparation of a micro-fibrous nonwoven fabric of the suede leather type, comprising the following steps:
   a) spinning a two-component fiber of the "islands in the sea" type having an island component and a sea component;
   b) preparing a felt from the two-component fiber;
   c) treating the felt with thermal stabilization;
   d) impregnating the felt with polyurethane from an aqueous polyurethane emulsion;
   e) fixing the polyurethane to the felt;
   f) removing the sea component from the felt with water or an acid or alkaline aqueous solution;
   g) impregnating the felt with polyurethane a second time from one of an aqueous emulsion and a high durability polyurethane in organic solvent;
   h) fixing the polyurethane to the felt a second time to obtain a non-woven fabric; and
   i) applying a finishing treatment to the non-woven fabric.
2. The process for the preparation of micro-fibrous nonwoven fabric according to claim 1 wherein the island component comprises a polymer selected from the group consisting of polyesters, polyamides and polyolefines.
3. The process for the preparation of micro-fibrous nonwoven fabric according to claim 2 in which the island component comprises a polymer selected from the group consisting of polyethyleneterephthalate, polytrimethyleneterephthalate, nylon, polyethylene and polypropylene.
4. The process for the preparation of micro-fibrous nonwoven fabric according to claim 1 in which the sea component is a polymer spinnable with the island component and which can be removed by a treatment with water or with an alkaline or acid aqueous solution.
5. The process for the preparation of micro-fibrous nonwoven fabric according to claim 4 in which the sea component is preferably selected from the group consisting of modified polyesters, polyamides and polyhydroxyalkanoates.
6. The process for the preparation of micro-fibrous nonwoven fabric according to claim 1 in which the ratio between the island component and the sea component used in the spinning ranges between about 20/80 and about 80/20.
7. The process for the preparation of micro-fibrous nonwoven fabric according to claim 1 in which the thermal stabilization of the felt is carried out with one of warm water or warm air.
8. The process for the preparation of micro-fibrous nonwoven fabric according to claim 1 in which the impregnation of steps d) and g) are carried out with polyurethane at concentrations between about 1% and about 30% by weight.
9. The process for the preparation of micro-fibrous nonwoven fabric according to claim 1 in which the impregnation of steps d) and g) are carried out with different polyurethane aqueous emulsions.
10. The process for the preparation of micro-fibrous non-woven fabric according to claim 1 in which the impregnation of steps d) and g) are carried out with different polyurethanes: a first polyurethane comprising an aqueous emulsion polyurethane and a second polyurethane comprising a high durability polyurethane in organic solvent.
11. The process for the preparation of micro-fibrous non-woven fabric according to claim 1 in which the impreg- nation of steps d) and g) are carried out with the same polyurethane aqueous emulsions.

12. The process for the preparation of micro-fibrous non-woven fabric according to claim 1 in which the fixing of polyurethane of steps e) and h) are carried out according to one of the following procedures: coagulation in an acid or a salt solution; drying through microwave or radio frequency; and treatment with saturated vapor by the addition of a thickening agent to the polyurethane aqueous emulsion.

13. The process for the preparation of micro-fibrous non-woven fabric according to claim 1 in which fixing polyurethane in step h) is carried out by coagulation in a solvent/non-solvent mixture in the ratio between about 0/100 and about 40/60 at a temperature of from about 20° to about 50° C.

14. The process for the preparation of micro-fibrous non-woven fabric according to claim 1 in which between about 0.5% to about 10% by weight of reticulating agent is added to the aqueous polyurethane emulsion.

15. The process for the preparation of micro-fibrous non-woven fabric according to claim 14 in which the reticulating agent is selected from the group consisting of melamine, aziridine, carbodiimides, epoxides, zirconium compounds, isocyanate base, and blocked isocyanate.

16. A process for the preparation of a micro-fibrous non-woven fabric of the suede leather type, comprising the following steps:
   a) spinning a two-component fiber of the "islands in the sea" type having an island component and a sea component;
   b) preparing a felt from the two-component fiber;
   c) treating the felt with thermal stabilization;
   d) impregnating the felt with polyurethane from an aqueous polyurethane emulsion;
   e) fixing the polyurethane to the felt;
   f) removing the sea component from the felt;
   g) impregnating the felt with polyurethane a second time from one of an aqueous emulsion and a high durability polyurethane in organic solvent;
   h) impregnating the felt with aqueous silicone solution
   i) fixing the polyurethane to the felt a second time to obtain a non-woven fabric; and
   j) applying a finishing treatment to the non-woven fabric.

17. The process for the preparation of micro-fibrous non-woven fabric according to claim 16 in which the aqueous silicone solution has a concentration of between about 0.1% and about 1.1% by weight.

18. A process for the preparation of a micro-fibrous non-woven fabric of the suede leather type, comprising the following steps:
   a) spinning a two-component fiber of the "islands in the sea" type having an island component and a sea component;
   b) preparing a felt from the two-component fiber;
   c) treating the felt with thermal stabilization;
   d) impregnating the felt with polyurethane from an aqueous polyurethane emulsion;
   e) fixing the polyurethane to the felt;
   f) removing the sea component from the felt;
   g) impregnating the felt with polyurethane a second time from one of an aqueous emulsion and a high durability polyurethane in organic solvent;
   h) fixing the polyurethane to the felt a second time to obtain a non-woven fabric; and
   i) applying a finishing treatment to the non-woven fabric
   wherein the high durability polyurethane comprises:
   "hard" segments comprising urethanic groups, deriving from the reaction of diisocynates with polyols, and ureic groups deriving from the reaction of free isocyanate groups and water; and
   "soft" segments comprising a polyol-polycarbonate/polyol-polyester mixture, in a ratio ranging from about 80/20 to about 20/80.

* * * * *

UNITED STATES PATENT AND TRADEMARK OFFICE
CERTIFICATE OF CORRECTION

PATENT NO. : 6,890,602 B2
DATED : May 10, 2005
INVENTOR(S) : Gianni Romani

It is certified that error appears in the above-identified patent and that said Letters Patent is hereby corrected as shown below:

Title page,
Item [75], Inventors, change "Configini" to -- Configni --.

Column 14,
Line 1, add -- ; -- after "solution".

Signed and Sealed this

Sixteenth Day of August, 2005

JON W. DUDAS
*Director of the United States Patent and Trademark Office*